Nov. 26, 1935.  R. F. KOHR  2,022,044
BRAKE
Filed April 27, 1931

INVENTOR.
ROBERT F. KOHR
BY O. H. Fowler
ATTORNEY

Patented Nov. 26, 1935

2,022,044

UNITED STATES PATENT OFFICE 2,022,044

BRAKE

Robert F. Kohr, South Bend, Ind., assignor to Bendix Brake Company, South Bend, Ind., a corporation of Illinois Application April 27, 1931, Serial No. 533,242

2 Claims. (Cl. 188—78)

This invention relates to internal expanding brakes.

Broadly, the invention comprehends a heavy duty brake including interchangeable friction elements or shoes actuated by a servo shoe to effectively apply the friction elements.

An object of the invention is to provide an actuating means for an internal expanding brake whereby the friction elements are applied through the instrumentality of a servo shoe arranged to apply force to the separable ends of the friction elements with an increased effectiveness.

Another object of the invention is to provide applying means for the friction elements of an internal expanding brake including a servo shoe and means connected with the servo shoe for applying the friction elements with an increased force.

An important feature is a floating lever, a servo shoe connected to one end of the lever, the other end of the lever engaging the anchoring end of either of a pair of tandem shoes.

Another feature of the invention is interchangeable brake shoes, a fixed anchor positioned between the separable ends of the brake shoes, a floating lever having one arm positioned between the separable ends of the shoes and its other arm carrying a servo shoe between the articulated ends of the shoes.

The above and other objects and features of the invention including various detailed structure and arrangement of parts will appear from the following description taken in connection with the drawing, which forms a part of this specification, and in which.

Figure 1:
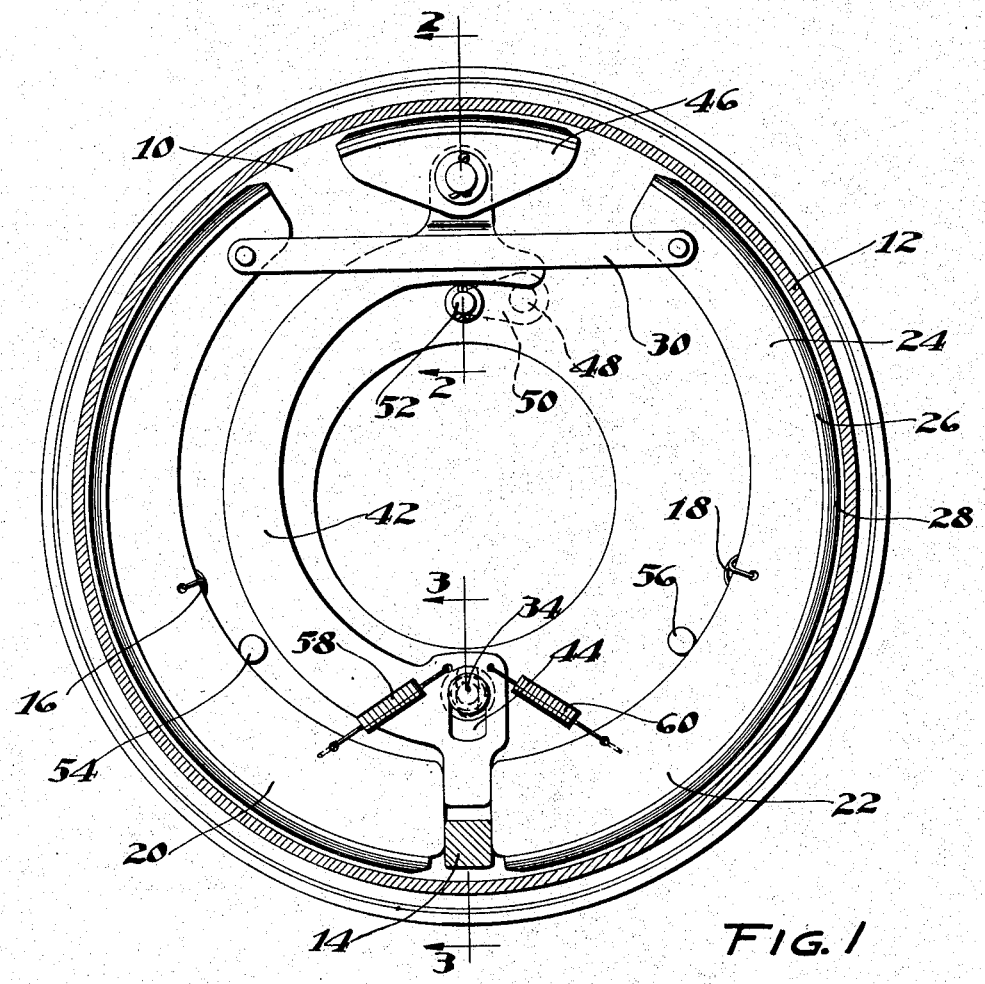
Figure 1 is a vertical sectional view of a brake taken just back of the head of the drum illustrating the friction elements in side elevation and showing the invention as applied.
Figures 2, 3:
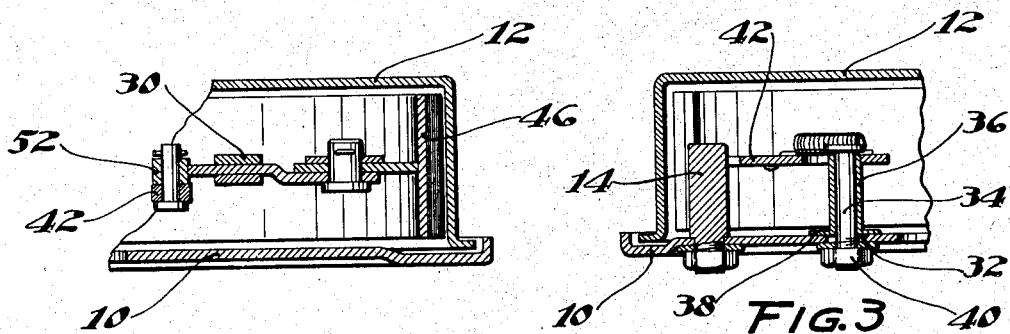
Figure 2 is a vertical sectional view substantially on line 2—2, Figure 1.
Figure 3 is a vertical sectional view substantially on line 3—3, Figure 1.

Referring to the drawing, 10 represents a fixed support such as a backing plate. Associated with the backing plate is a rotatable drum 12 which may be secured to a wheel, not shown, and positioned on the backing plate is a fixed anchor 14. Arranged on the backing plate on suitable steady rests 16 and 18 are interchangeable shoes 20 and 22.

The shoes are of the conventional type including a web 24 supporting a rim 26 to which is suitably secured a lining 28 adaptable for cooperation with the drum. As shown, the articulated ends of the friction elements or shoes 20 and 22 are spaced apart and are connected by a suitable link 30, and the shouldered or separable ends of the shoes are adaptable for engagement with the fixed anchor 14.

The backing plate 10 is provided with a slot 32 in which is positioned a bolt 34. As shown, the bolt 34 has positioned thereon a sleeve 36 provided with a flange 38 bearing against the backing plate and the bolt is secured in an adjusted position by a nut 40 threaded thereon.

As shown, a lever 42 is provided with a slot 44 which slips over the sleeve 36 on the bolt 34. One end of the lever is extended between the separable ends of the friction elements or shoes 20 and 22, and the other end of the lever has pivoted thereto a servo shoe 46 positioned between the connected ends of the shoes 20 and 22. As shown, the body of the lever is curved to clear the axle or swiveling knuckle to which the brake may be secured.

Positioned for rotation on the backing plate is an operating shaft 48 having keyed or otherwise secured thereto an arm 50 on the free end of which is positioned a roller 52 adapted to engage the lever, so that the lever may be moved to engage the servo shoe 46 with the drum.

When in the off position the shoes 20 and 22 are retained against the stops 54 and 56 by a return spring 58 connected between the shoe 20 and the lever and by a return spring 60 connected between the shoe 22 and the lever. These springs serve to return and retain the shoe against the stops in proper spaced relation to the braking surface of the drum.

In operation, with the drum turning counterclockwise, force is applied to rotate the shaft 48 whereupon the arm 50 moves the lever 42 to engage the servo shoe 46 with the drum. Upon engagement of the shoe 46 with the drum the shoe is given a slight centrifugal movement due to the wiping action of the drum. This movement actuates the lever to apply force to the shoe 22 and to move the shoe into drum engagement, thereupon the shoe 22 is given a slight centrifugal movement, which movement transmits the applied force through the connecting link 30 to the shoe 20. With drum turning in the opposite direction, shoe 20 is forced outwardly by lever 42 to apply the brake, and shoe 22 remains anchored. It will be noted that, due to the wiping action of the drum on shoe 46 predetermining the direction of movement of lever 42, the shoe 20 or 22 which transmits the ultimate braking torque to the anchor 14 never leaves the anchor during the application of the brake, and therefore never comes back to the anchor with a shock or noise (unless the drum is reversed in its direction of movement while the brake is held applied, in which case there is a slight movement as the anchorage shifts from the one shoe to the other, but at such a slow speed that it is not noticeable).

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a drum, a pair of connected shoes adjacent the drum, an anchor between the unconnected ends of the shoes, a servo shoe between the connected ends of the shoes, and spreading means actuated by the servo shoe and acting on the unconnected ends of the shoes adjacent the anchor and arranged to force one or the other of the shoes against the drum while leaving the other shoe in continuous torque-transmitting engagement with said anchor.

2. A brake comprising a drum, a pair of connected shoes adjacent the drum, an anchor between the unconnected ends of the shoes, a servo shoe between the connected ends of the shoes, a connection between the connected ends of the shoes which is substantially longer than the servo shoe and which extends past the servo shoe without interfering with its movement, and spreading means actuated by the servo shoe and acting on the unconnected ends of the shoes adjacent the anchor.

ROBERT F. KOHR.